3 Sheets--Sheet 1.

F. T. LOMONT & J. GROJEAN.

Improvement in Harvesters.

No. 4,944. Reissued June 11, 1872.

Witnesses:
T. C. Bucht.
W. H. Rowe.

Inventor:
F. T. Lomont
J. Grojean
by their Atty
W. D. Baldwin

THE NORRIS PETERS CO., PHOTO-LITHO., WASHINGTON, D. C.

F. T. LOMONT & J. GROJEAN.

Improvement in Harvesters.

No. 4,944. Reissued June 11, 1872.

*Witnesses:*

T. C. Brecht.

M. H. Rowe.

*Inventor:*

F. T. Lomont
John Grojean
by their Atty
W. D. Baldwin

THE NORRIS PETERS CO., PHOTO-LITHO., WASHINGTON, D. C.

3 Sheets--Sheet 3.

F. T. LOMONT & J. GROJEAN.

Improvement in Harvesters.

No. 4,944. Reissued June 11, 1872.

Witnesses:

T. C. Brecht.

W. H. Rowe.

Inventor:

F. T. Lomont.
John Grojean
by their Atty
Wm. Baldwin

THE NORRIS PETERS CO., PHOTO-LITHO., WASHINGTON, D. C.

UNITED STATES PATENT OFFICE.

FRANK T. LOMONT AND JOHN GROJEAN, OF MASSILLON, ASSIGNORS, BY MESNE ASSIGNMENTS, TO WILLIAM K. MILLER, OF CANTON, OHIO.

IMPROVEMENT IN HARVESTERS.

Specification forming part of Letters Patent No. 27,641, dated March 27, 1860; reissue No. 4,944, dated June 11, 1872.

*To all persons whom it may concern:*

Be it known that we, FRANK T. LOMONT and JOHN GROJEAN, both of Massillon, in the county of Stark and State of Ohio, have invented certain new and useful Improvements in Reaping and Mowing Machines, of which the following is a specification:

Our invention relates more especially to that class of harvesters known as "two-wheeled" hinge-joint machines. The objects of our improvements are to allow a hinged finger-beam freely to conform to the inequalities of the ground over which it glides without imparting corresponding movements to the main frame; to brace the finger-beam firmly against lateral strains while leaving it free to rock both longitudinally and transversely on its pivots; to provide means for rocking and lifting the finger-beam; and to prevent the lifting-chain from being thrown out of place during these movements. The subject-matter claimed is hereinafter particularly specified.

Figure 1:
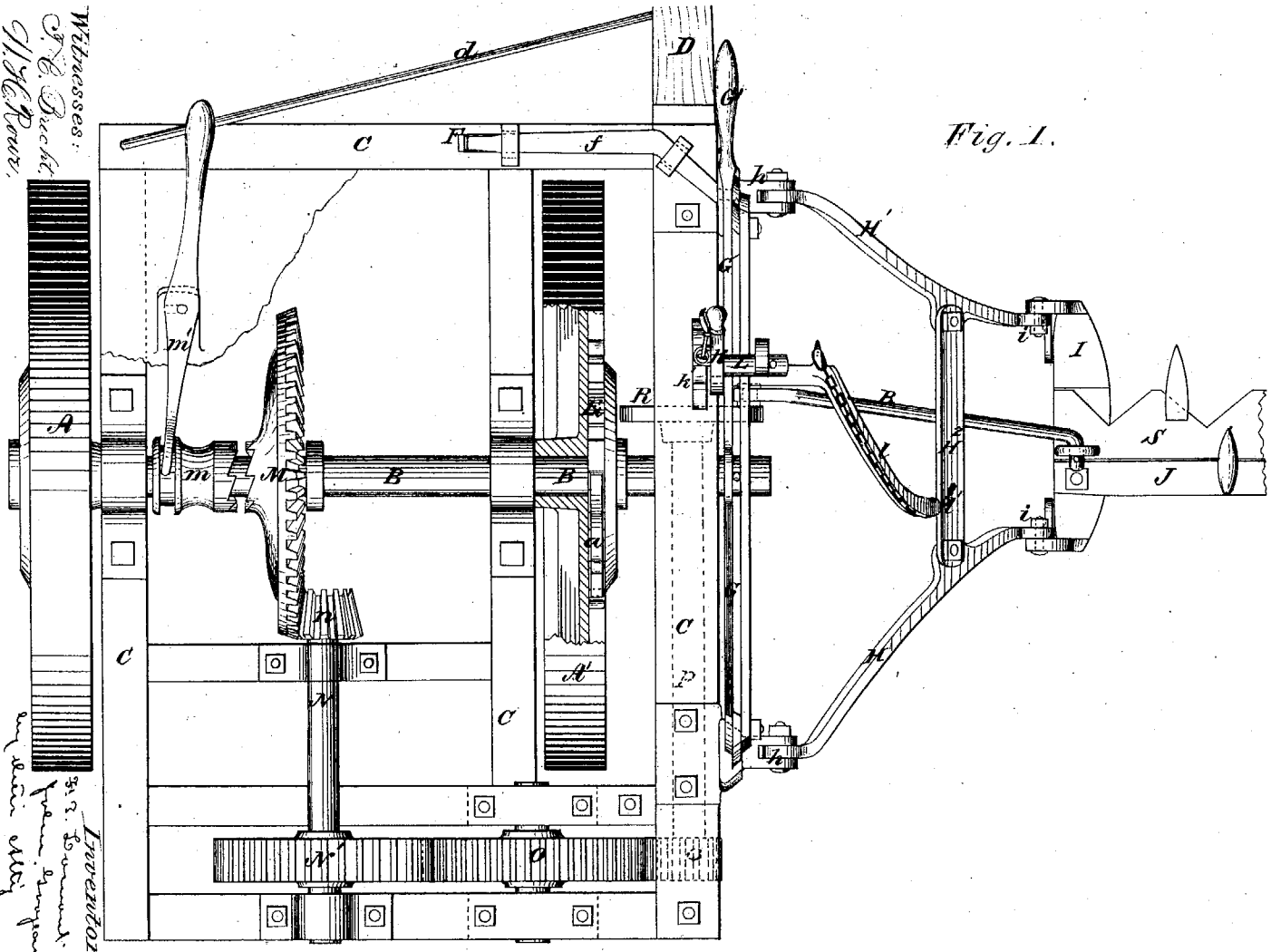
Figure 2:
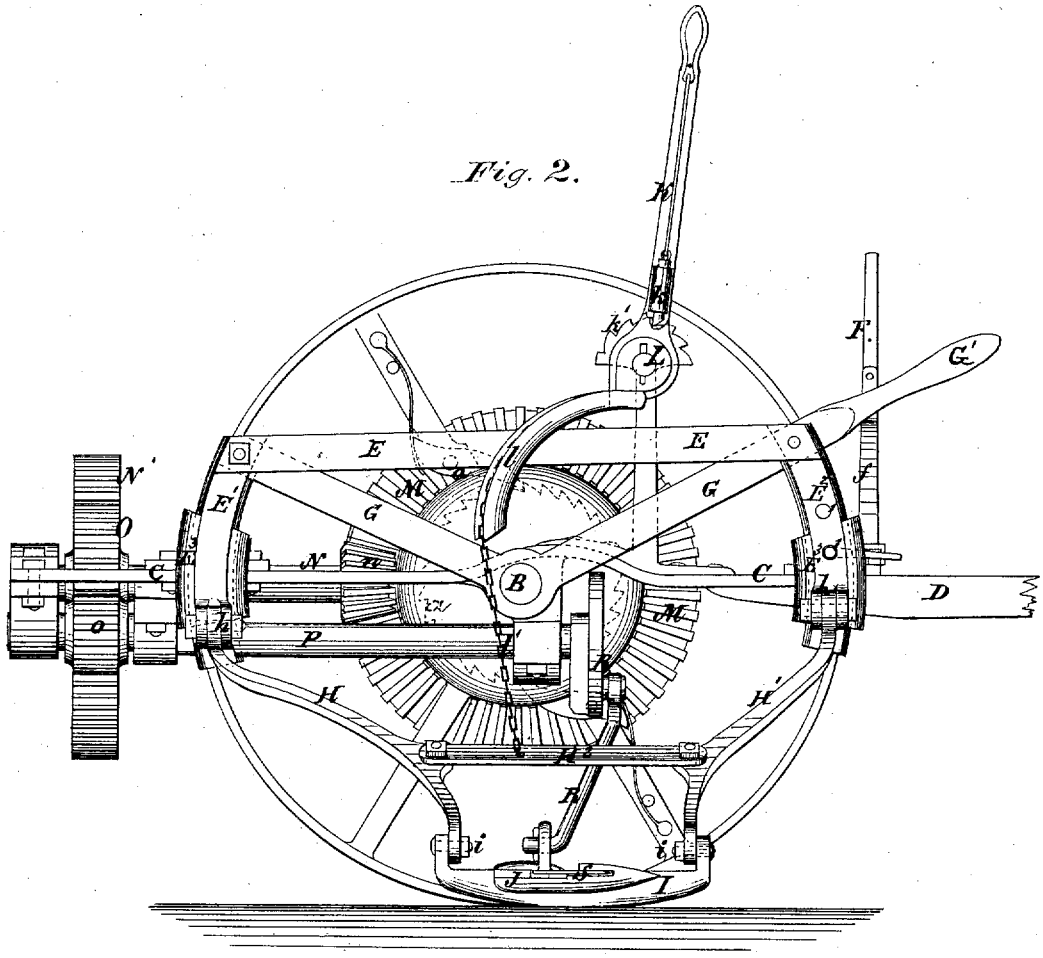
Figure 3:
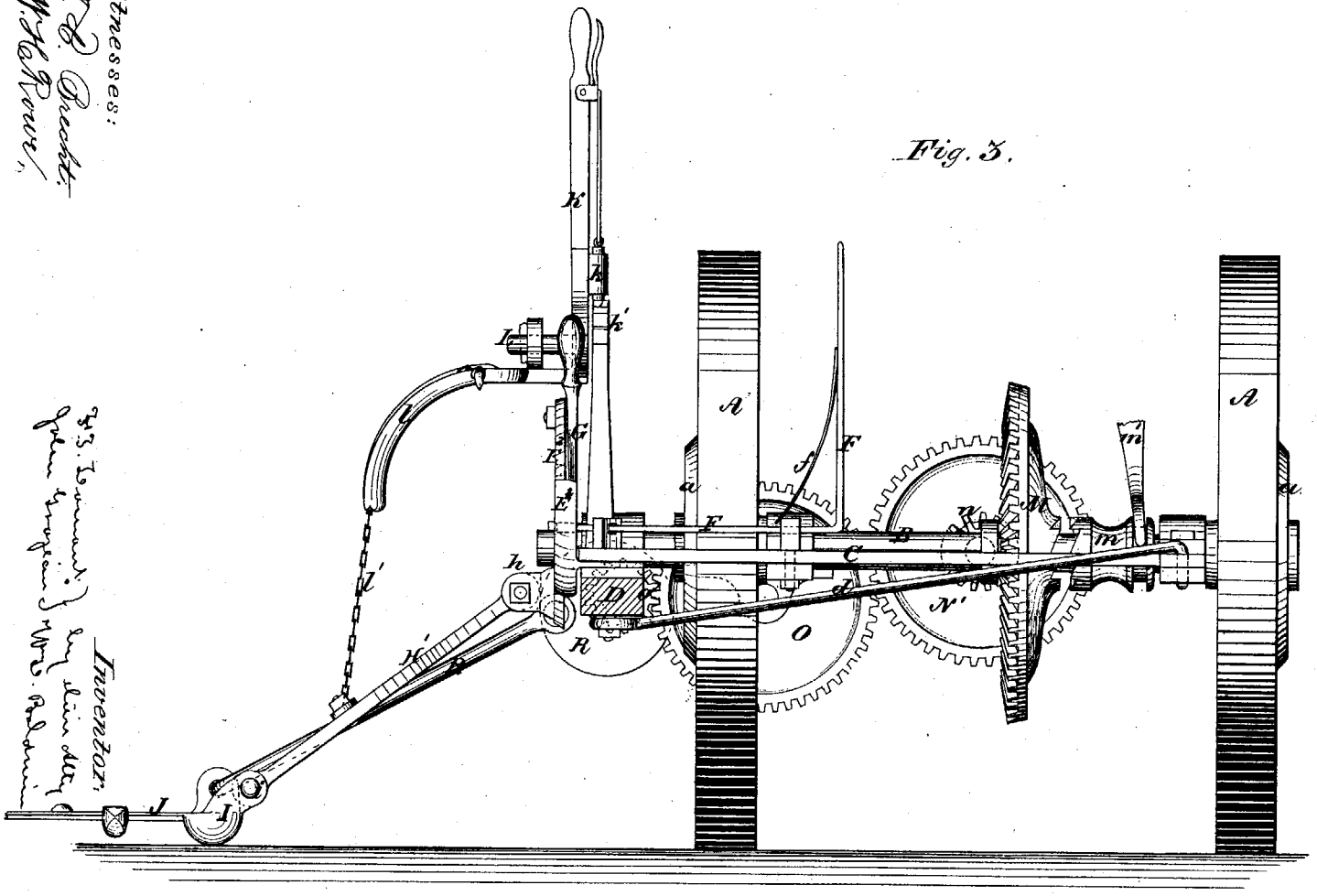

In the accompanying drawing, which shows all the improvements herein claimed embodied in one machine, Figure 1 represents a plan; Fig. 2, a side elevation; and Fig. 3, a front elevation.

Two main driving-wheels, A A′, turn loosely on an axle, B, with which they are connected by backing-ratchets *a*, as usual in machines of this class. A main frame, C, is mounted on this axle. A tongue, D, projects from the inner front corner of the frame, and is strengthened against lateral strains by a brace, *d*. A strong guide-frame, E, is pivoted at its center on the main axle, on which it vibrates. The end pieces $E^1$ $E^2$ of this frame are curved in arcs having this pivot for their center, and move endwise vertically in guide-ways $E^3$ on the main frame. A locking-bolt, F, movable endwise in guides on the frame, is provided with a spring, *f*, which tends constantly to force the bolt into one of a series of holes, 1, on the front arc $E^2$, and thus locks the rocking frame E in position. This frame can be rocked on its pivot by means of a hand-lever, G′, when the locking-bolt is released from the arc. A coupling-frame, composed of two arms, H $H^1$, and a cross-bar, $H^2$, is pin-jointed to lugs *h* on the arcs $E^1$ $E^2$ of the rocking-frame. A finger-beam, J, is hinged to this coupling-frame by hinges *i* on its shoe I. By this mode of construction the guard-fingers are tilted by rocking the frame E as above described. The heel end of the finger-beam is lifted by means of a chain, *l′*, attached to the cross-bar $H^2$, and passing over a curved sector, *l*, mounted on a rock-shaft, L, oscillated by a hand-lever, K, and controlled by a spring-detent, *k*, taking into a rack, *k′*. The sector *l*, it will be observed, is not only curved backward, but also inclines outward, (see Fig. 1,) so as to compensate the radial movement of the coupling-frame as it rises, and thus avoids twisting the chain out of the sector. A bevel-gear, M, runs loosely on the main axle when not locked with the clutch *m*, which is provided with the usual shipping-lever *m′*. The bevel-gear M drives a corresponding pinion, *n*, on a counter-shaft, N, which carries a spur-wheel, N′, driving an idle spur-wheel, O, which meshes with a spur-pinion, *o*, on a crank-shaft, P, which drives the cutters S by a crank and pitman, R, as usual.

We claim as our invention—

1. The combination of the main frame, the double-hinged coupling-frame adjustable thereon to rock the guards, and a finger-beam vibrating on its hinges in the coupling-frame, substantially as set forth, to allow the finger-beam to rock in its connections with the main frame, and to rise and fall with the coupling-frame without affecting the movements of the main frame.

2. The combination of the main frame, the finger-beam, the rocking guide-frame, the coupling-frame hinged both to the rocking guide-frame and finger-beam, and the locking-bolt, all these members being constructed and operated substantially as set forth, to lock the rocking-frame without interfering with the vertical vibration of the coupling-frame 3. The combination of the main frame, the hinged finger-beam, the coupling-frame hinged both to the main frame and finger-beam, the rocking lever and the lifting lever, these members being constructed and operating substantially as set forth, both to rock and lift the finger-beam without affecting the movement of the main frame.

4. The combination of the finger-beam, coupling-frame, lifting-chain, and outwardly-curved sector, substantially as set forth, to prevent the twisting of the chain off from the sector.

F. T. LOMONT.
JOHN GROJEAN.

Witnesses:
BENJAMIN RUSER,
BENNET B. WARNER.